(12) United States Patent
Shih et al.

(10) Patent No.: US 11,119,325 B1
(45) Date of Patent: Sep. 14, 2021

(54) NEAR EYE DISPLAY DEVICE

(71) Applicant: Coretronic Corporation, Hsin-Chu (TW)

(72) Inventors: Chih-Wei Shih, Hsin-Chu (TW); Chung-Ting Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/810,852

(22) Filed: Mar. 6, 2020

(51) Int. Cl.
*G06F 3/01* (2006.01)
*G02B 27/01* (2006.01)
*G02B 27/14* (2006.01)

(52) U.S. Cl.
CPC ....... *G02B 27/0172* (2013.01); *G02B 27/144* (2013.01)

(58) Field of Classification Search
CPC .............. G02B 27/0172; G02B 27/144; G02B 27/0093; G02B 27/0101; G02B 2027/014; G02B 13/14; G02B 2027/0138; G02B 2027/0178; H04N 5/33; H04N 5/232123; H04N 5/23212; G06F 3/013; G06T 19/006; A61B 3/005; A61B 3/113
See application file for complete search history.

(56) References Cited

U.S. PATENT DOCUMENTS

| | | | |
|---|---|---|---|
| 5,076,664 A | 12/1991 | Migozzi | |
| 6,829,095 B2 | 12/2004 | Amitai | |
| 7,391,573 B2 | 6/2008 | Amitai | |
| 7,576,916 B2 | 8/2009 | Amitai | |
| 8,810,914 B2 | 8/2014 | Amitai | |
| 2014/0111865 A1 | 4/2014 | Kobayashi | |

(Continued)

FOREIGN PATENT DOCUMENTS

| | | |
|---|---|---|
| CN | 104062760 | 9/2014 |
| CN | 108873328 | 11/2018 |
| CN | 108873329 | 11/2018 |

OTHER PUBLICATIONS

Yaakov Amitai, "P-27: A Two-Dimensional Aperture Expander for Ultra-Compact, High-Performance Head-Worn Displays", SID 05 DIGEST, May 2005, pp. 360-363.

(Continued)

*Primary Examiner* — Deeprose Subedi
(74) *Attorney, Agent, or Firm* — JCIPRNET

(57) ABSTRACT

A near eye display device includes a display and a first waveguide element, the first waveguide element including a light incoming surface, a light exiting surface, a reflective inclined surface and beam splitting elements. An image beam provided by the display enters the first waveguide element via the light incoming surface and is reflected by the reflective inclined surface in the first waveguide element to the beam splitting elements, and is split by the beam splitting elements and leaves the first waveguide element via the light exiting surface. The reflective inclined surface has a first reflectivity distribution in a first incident angle range and a second reflectivity distribution in a second incident angle range. An angle in the second incident angle range is greater than an angle in the first incident angle range, and the first reflectivity distribution has a greater reflectivity average value than the second reflectivity distribution.

18 Claims, 13 Drawing Sheets

(56) References Cited

U.S. PATENT DOCUMENTS

| | | |
|---|---|---|
| 2016/0085300 A1* | 3/2016 | Robbins ............ G02B 27/0093 345/633 |
| 2018/0101011 A1 | 4/2018 | Shih et al. |
| 2018/0203236 A1 | 7/2018 | Shih et al. |
| 2018/0203237 A1 | 7/2018 | Shih et al. |
| 2018/0335628 A1 | 11/2018 | Hung et al. |

OTHER PUBLICATIONS

Hu Xinrong, et al., "Optical System Design of Head-Mounted Display Based on Planar Waveguide of semi-Transparent Film Array" Acta Optica Sinica, vol. 34, No. 9, Sep. 2014, pp. 0922001-1-0922001-6.

Han Xinyan, et al., "See-Through Video Glass Based on Cascaded Waveguide Combiner." Acta Optica Sinica, vol. 25, No. 5, May 2015, pp. 0522004-1-0522004-9.

* cited by examiner

NEAR EYE DISPLAY DEVICE

BACKGROUND

Field of the Invention

The invention relates to a head-mounted display device, in particular, to a near eye display device.

Description of Related Art

A near eye display (NED) is applied to a display system of a head-mounted display (HMD) and is a next-generation killer product with remarkable development potential at present. Current near eye display technology related application may be classified into augmented reality (AR) technology and virtual reality (VR) technology. In terms of the augmented reality technology, relevant developers are currently committed to providing a near eye display with good image quality while having light weight and small size.

In an optical architecture using the near eye display to realize the augmented reality, an image beam for display emitted from a projection device is reflected by an optical element with half reflection and half penetration to enter eyes of a user. Beams for displaying an image and external environmental beams enter the eyes of the user, thereby achieving a display effect of the augmented reality. However, in the process of using a traditional near eye display, the user often encounters a problem of ghost images in a display image. That is to say, the user sees not only an expected image but also an unexpected image. Therefore, how to prevent ghost images from occurring in the display image provided by the near eye display and enable the near eye display to have favorable sight range and visual quality so as to provide a good user experience is one of important topics at present.

The information disclosed in this Background section is only for enhancement of understanding of the background of the described technology and therefore it may contain information that does not form the prior art that is already known to a person skilled in the art. Further, the information disclosed in the Background section does not mean that one or more problems to be resolved by one or more embodiments of the invention was acknowledged by a person of ordinary skill in the art.

SUMMARY OF THE INVENTION

Embodiments of the invention provide a near eye display device which effectively solves the problem of ghost images caused by secondary reflection stray light and provides good display quality.

Other objectives and advantages of the invention may be further understood from the technical features disclosed in the invention.

In order to achieve one or some or all of the above objectives or other objectives, one embodiment of the invention provides a near eye display device. The near eye display device includes a display and a first waveguide element. The display is adapted to provide an image beam. The first waveguide element includes a first light incoming surface, a first light exiting surface, a reflective inclined surface and a plurality of first beam splitting elements, wherein the image beam enters the first waveguide element via the first light incoming surface, and is reflected by the reflective inclined surface in the first waveguide element to be transmitted to the first beam splitting elements. The image beam is split by the first beam splitting elements and leaves the first waveguide element via the first light exiting surface. The reflective inclined surface has a first reflectivity distribution in a first incident angle range and a second reflectivity distribution in a second incident angle range. An angle in the second incident angle range is greater than an angle in the first incident angle range. A reflectivity average value of the first reflectivity distribution is greater than a reflectivity average value of the second reflectivity distribution. The first incident angle range and the second incident angle range are each a continuous angle range.

Another embodiment of the invention provides a near eye display device. The near eye display device includes a display and a first waveguide element. The display is adapted to provide an image beam. The first waveguide element includes a first light incoming surface, a first light exiting surface, a reflective inclined surface and a plurality of first beam splitting elements, wherein the image beam enters the first waveguide element via the first light incoming surface, and is reflected by the reflective inclined surface in the first waveguide element to be transmitted to the first beam splitting elements. The image beam is split by the first beam splitting elements and leaves the first waveguide element via the first light exiting surface to be transmitted to a human eye. The reflective inclined surface has a first reflectivity distribution in a first incident angle range and a second reflectivity distribution in a second incident angle range. A surface of each of the plurality of first beam splitting elements is provided with a first transflective coating. A difference between reflectivities of the first transflective coating corresponding to red, blue and green wavelengths in a third incident angle range falls within 5%. The third incident angle range falls in a range of 19 degrees to 41 degrees.

Based on the above, the near eye display device according to embodiments of the invention is provided with the reflective inclined surface, and the reflectivity average value of the reflective inclined surface in the first incident angle range in which angles are relatively small is greater than the reflectivity average value in the second incident angle range in which angles are relatively large, so that a situation can be avoided in which the image beam is reflected twice on the reflective inclined surface after entering the first waveguide element, thereby preventing unexpected light from entering a projection target. In addition, the near eye display device according to embodiments of the invention is also provided with a plurality of beam splitting elements, the surface of each of the beam splitting elements is provided with a transflective coating, and the reflectivity of the transflective coating is insensitive to a wavelength change within a continuous incident angle range. Therefore, the near eye display device according to embodiments of the invention effectively solves the ghost image problem caused by secondary reflection stray light, and also provides good display quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
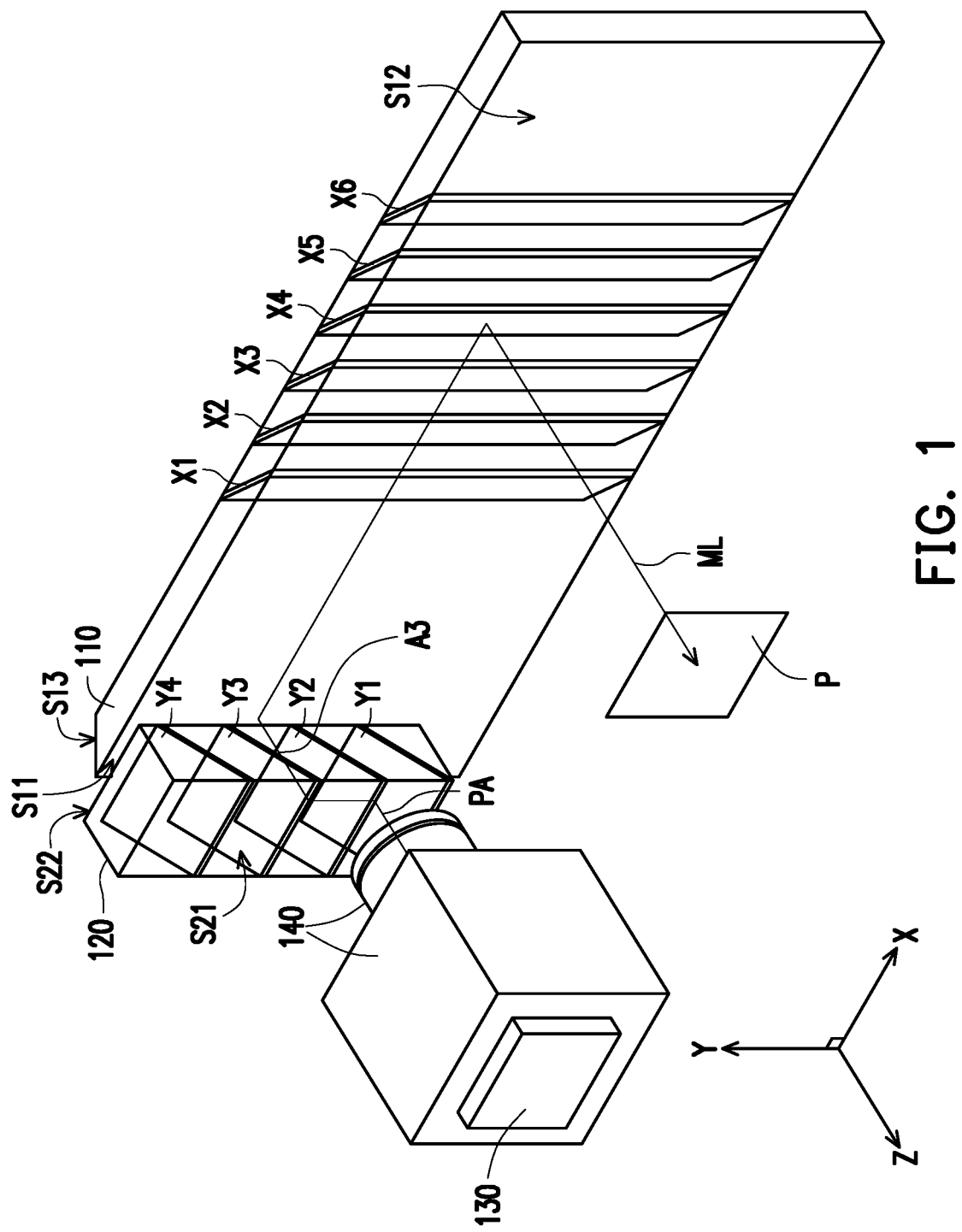
FIG. 1 is a schematic three-dimensional view showing a near eye display device according to one embodiment of the invention.
Figure 2:
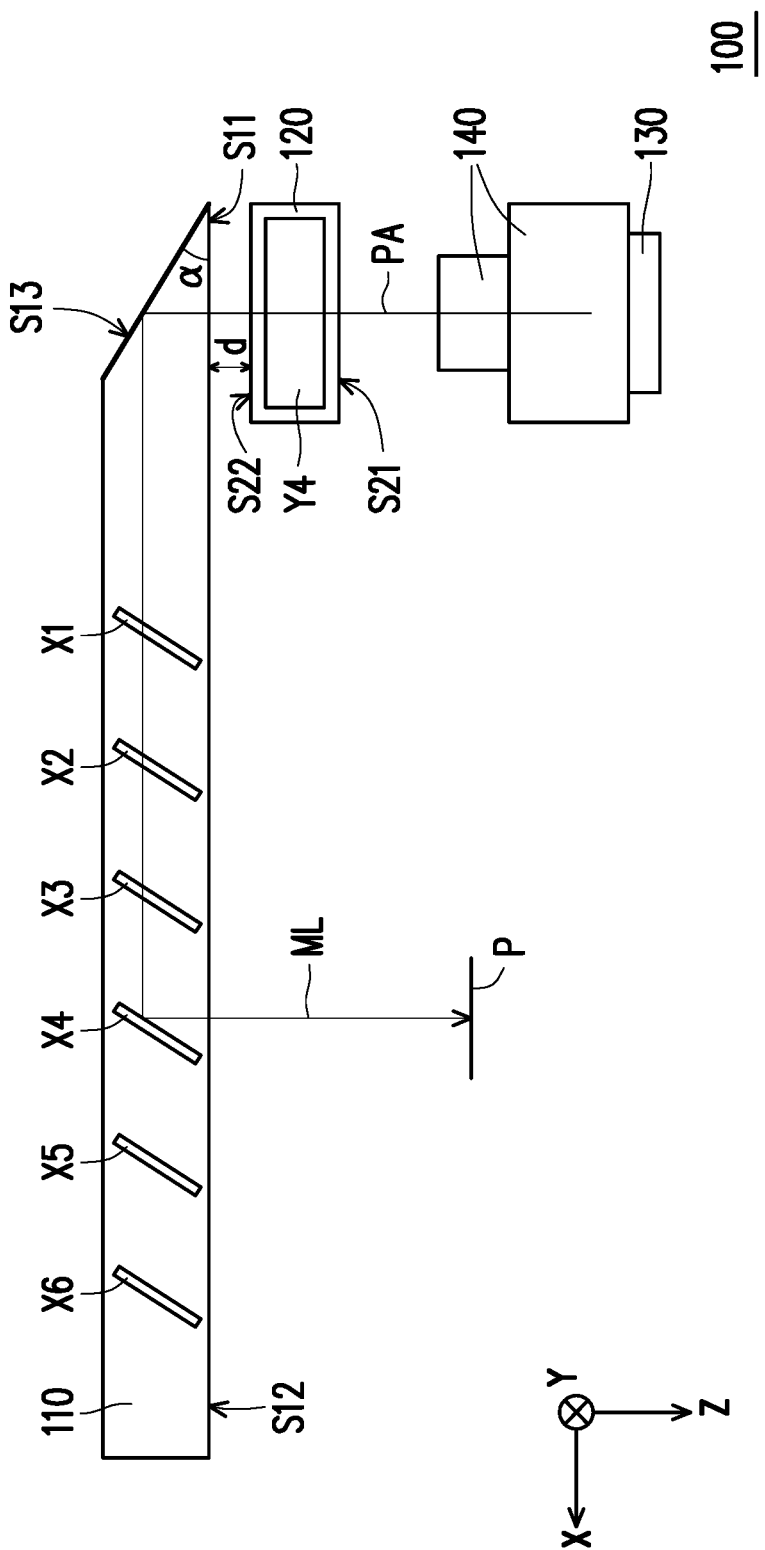
FIG. 2 is a schematic side view showing the near eye display device of FIG. 1.

FIG. 1 is a schematic three-dimensional view showing a near eye display device according to one embodiment of the invention. FIG. 2 is a schematic side view showing the near eye display device of FIG. 1. Referring to FIG. 1 and FIG. 2, a near eye display device 100 of the embodiment includes a first waveguide element 110, a second waveguide element 120, a display 130 and a lens module 140. The display 130 is adapted to provide an image beam ML. The second waveguide element 120 is disposed on a transmission path PA of the image beam ML and located between the display 130 and the first waveguide element 110. The lens module 140 is disposed between the display 130 and the second waveguide element 120.

In the embodiment, the first waveguide element 110 is disposed on the transmission path PA of the image beam ML and includes a first light incoming surface S11, a first light exiting surface S12 and a plurality of first beam splitting elements X1, X2, X3, X4, X5 and X6 as well as a reflective inclined surface S13. The reflective inclined surface S13 is connected with the first light incoming surface S11, so that a junction area with an included angle α is formed on one end portion of the first waveguide element 110. The first waveguide element 110 extends along a first direction X, the first beam splitting elements X1, X2, X3, X4, X5 and X6 are arranged along the first direction X, and the number of the beam splitting elements is not limited herein. In the embodiment, the first light incoming surface S11 and the first light exiting surface S12 are different portions located on the same surface of the first waveguide element 110; however, in other embodiments, according to the actual requirements, the first light incoming surface S11 and the first light exiting surface S12 may be different surfaces and the invention is not limited thereto.

The second waveguide element 120 includes a second light incoming surface S21, a second light exiting surface S22 and a plurality of second beam splitting elements Y1, Y2, Y3 and Y4. The second waveguide element 120 extends along a second direction Y, and the second beam splitting elements Y1, Y2, Y3 and Y4 are arranged along the second direction Y. In the embodiment, the second light incoming surface S21 and the second light exiting surface S22 are oppositely arranged; however, in other embodiments, according to different set positions of the display 130, the second light incoming surface S21 may be adjacent to the second light exiting surface S22, and the invention is not limited thereto.

In the embodiment, the first beam splitting elements X1, X2, X3, X4, X5 and X6 as well as the second beam splitting elements Y1, Y2, Y3 and Y4 are each provided with a half-penetration and half-reflection coating, so the image beam ML has an optical effect of partial penetration and partial reflection at the first beam splitting elements X1, X2, X3, X4, X5 and X6 and the second beam splitting elements Y1, Y2, Y3 and Y4.

Each of the above waveguide elements is, for example, made of a transparent material and is a transparent plastic product or glass. The number of beam splitting elements included in each waveguide element and a space between two adjacent beam splitting elements are designed according to different product requirements, and are not used to limit the invention. Moreover, the number of the first beam splitting elements may be the same as or different from the number of the second beam splitting elements, and the space between the adjacent beam splitting elements may be the same or different. In the embodiment, an included angle between each beam splitting element and the corresponding light incoming surface is generally equal to 30 degrees or in a range of 30+/−15 degrees, or equal to 45 degrees or in a range of 45+/−15 degrees, and is designed according to different product requirements and is not used to limit the invention. In one embodiment, the included angle of each beam splitting element may be equal or unequal. In addition, the reflectivity of each beam splitting element in one embodiment is appropriately adjusted according to an incident angle or a wavelength.

In the embodiment, the display 130 provides the image beam ML. The display 130, for example, includes an image projection system such as a digital light processing (DLP) projection system, a liquid-crystal display (LCD) projection system or a liquid crystal on silicon (LCoS) projection system and the invention is not limited thereto. Furthermore, the lens module 140 includes one or more lenses or other beam transmitting elements.

In the embodiment, the image beam ML may have a single polarization direction.

Figure 3:
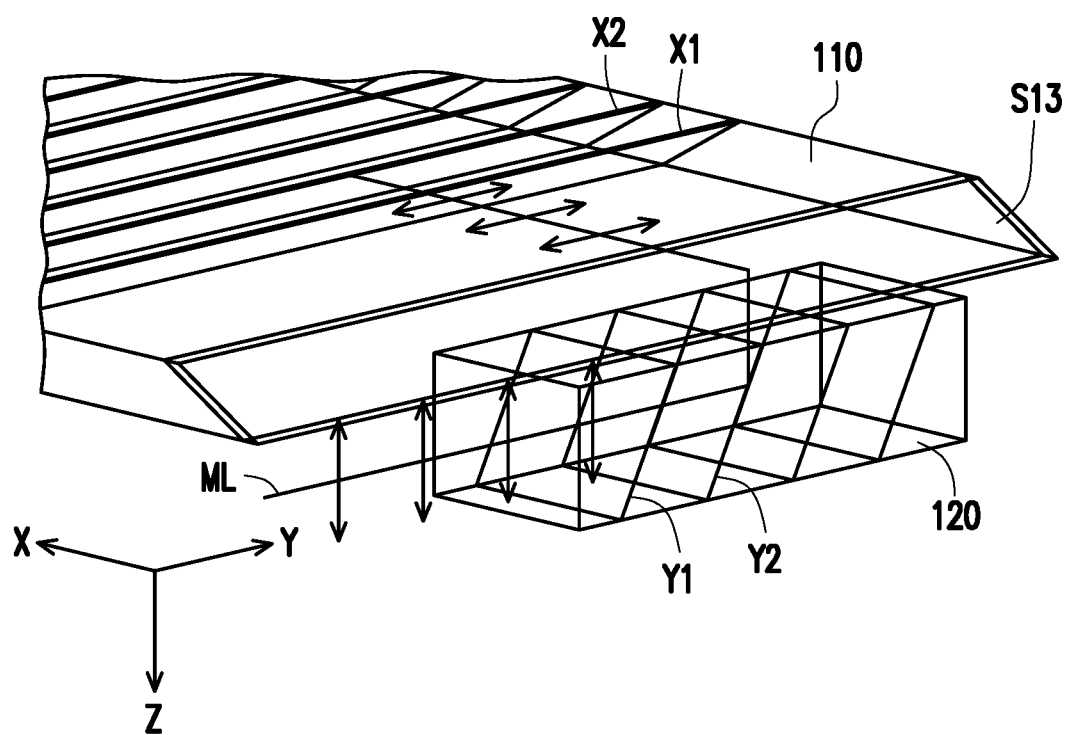
FIG. 3 is a schematic diagram showing polarization directions of an image beam with respect to different waveguide elements according to one embodiment of the invention.

Referring to FIG. 3, FIG. 3 is a schematic diagram showing polarization directions of an image beam with respect to different waveguide elements according to one embodiment of the invention. For easy illustration, an anti-reflection structure is not shown. For example, for the second beam splitting elements Y1, Y2, Y3 and Y4, the image beam ML entering the second waveguide element 120 is light in the P polarization direction (like a third direction Z). In the embodiment, the extension direction of the first waveguide element 110 is the first direction X, and the extension direction of the second waveguide element 120 is the second direction Y. When the image beam ML with the P polarization direction leaves the second waveguide element 120 and is reflected by the reflective inclined surface S13 to be transmitted in the first waveguide element 110, the polarization direction of the image beam ML in the first waveguide element 110 is an S polarization direction (like a second direction Y) for the first beam splitting elements X1, X2, X3, X4, X5 and X6. Therefore, respective coatings of the first beam splitting elements and the second beam splitting elements are designed according to the image beam ML with the single polarization direction.

Referring to FIG. 1 and FIG. 2, in the embodiment, the image beam ML from the display 130 is transmitted along the third direction Z in the lens module 140, passes through the lens module 140, and enters the second waveguide element 120 via the second light incoming surface S21 and is transmitted to the second beam splitting elements Y1, Y2, Y3 and Y4 along the transmission path PA. In the embodiment, a part of the image beam ML in the second waveguide element 120 is reflected by the second beam splitting element Y1 and a part of the image beam ML penetrates the second beam splitting element Y1 to be transmitted along the second direction Y, and the image beam ML leaves the second waveguide element 120 along the third direction Z via the second light exiting surface S22 after being reflected by the second beam splitting elements Y1, Y2, Y3 and Y4.

Referring to FIG. 2, in the embodiment, the first waveguide element 110 and the second waveguide element 120 have a space d therebetween in the third direction Z. More specifically, the first light incoming surface S11 of the first waveguide element 110 and the second light exiting surface S22 of the second waveguide element 120 have the space d therebetween in the third direction Z. The image beam ML continues to be transmitted along the third direction Z after leaving the second waveguide element 120 from the second light exiting surface S22, and passes through the space d to enter the first waveguide element 110 from the first light incoming surface S11 to be transmitted to the reflective inclined surface S13. The image beam ML is transmitted to the first beam splitting elements X1, X2, X3, X4, X5 and X6 after being reflected by the reflective inclined surface S13. The reflective inclined surface S13 has thereon, for example, a reflection coating which reflects the light.

In the embodiment, the image beam ML in the first waveguide element 110 is transmitted along the first direction X. The image beam ML leaves the first waveguide element 110 from the first light exiting surface S12 after penetrating and being reflected by the first beam splitting elements X1, X2, X3, X4, X5 and X6, and is projected onto a projection target P, such as a pupil or eyes of a user. In one embodiment, the projection target P is, for example, an image sensing device receiving the image beam ML, such as a charge-coupled device (CCD) or a complementary metal-oxide-semiconductor (CMOS) image sensor.

In the embodiment, the image beam ML has a corresponding visual angle at the projection target P. The visual angle, for example, includes a first visual angle in the first direction X and a second visual angle in the second direction Y. In the embodiment, the first visual angle is determined, for example, according to the number of the first beam splitting elements in the first waveguide element 110, a distance from the first sheet to the last sheet of the first beam splitting elements, or a distance between two adjacent beam splitting elements. Similarly, the second visual angle is determined, for example, according to the number of the second beam splitting elements in the second waveguide element 120, a distance from the first sheet to the last sheet of the second beam splitting elements, or a distance between two adjacent beam splitting elements. In the embodiment, a visual angle in a diagonal direction of the projection target P is determined according to the first visual angle in the first direction X and the second visual angle in the second direction Y and is about between 20 degrees and 60 degrees. The visual angle in the diagonal direction is designed according to different product requirements, and is not used to limit the invention.

Based on the above, the image beam ML enters the first waveguide element 110 and the second waveguide element 120; however, when the image beam ML enters the reflective inclined surface S13 at a small angle, an unexpected reflection beam is easily generated. For example, when the image beam ML enters the reflective inclined surface S13 at a small angle in the first waveguide element 110, more than one reflection beam occurs on the reflective inclined surface S13.

Figure 4:
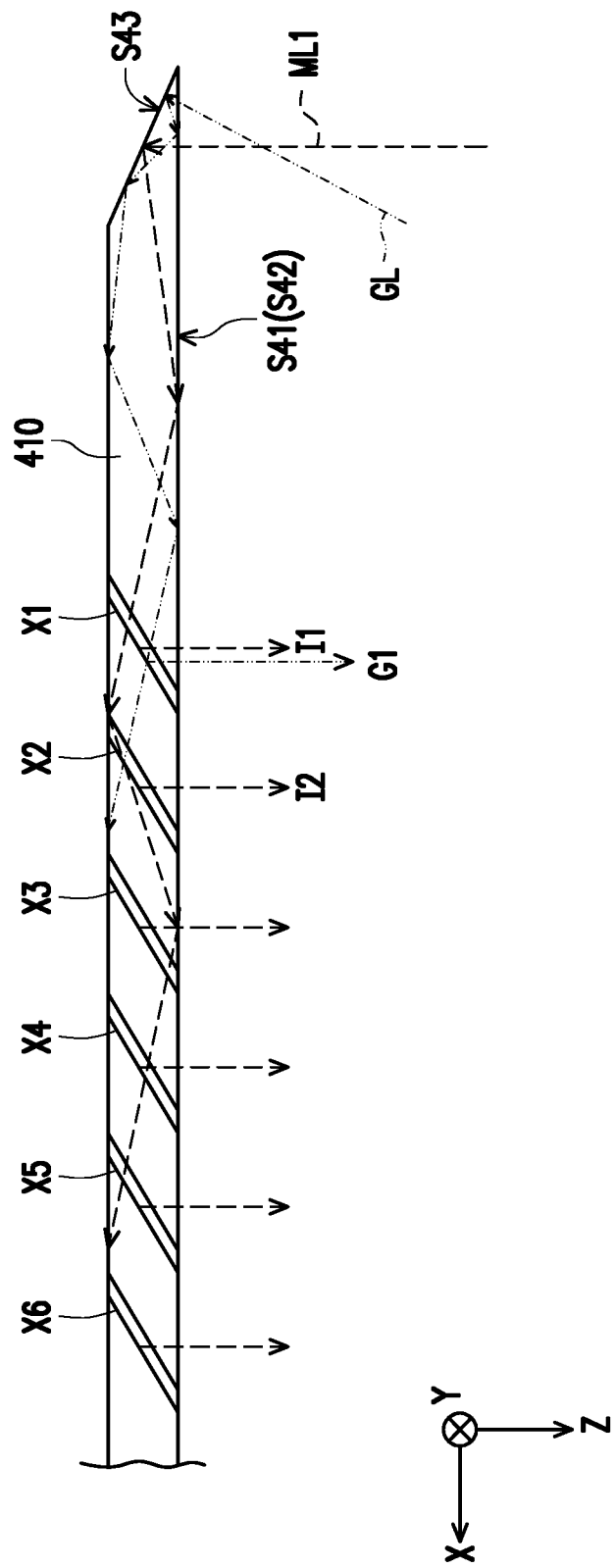
FIG. 4 is a schematic diagram showing ghost image light generated by the image beam entering a waveguide element according to the related art.

Referring to FIG. 4, FIG. 4 is a schematic diagram showing ghost image light generated by the image beam entering a waveguide element according to the related art. In the embodiment, a waveguide element 410 is taken as an example. In the embodiment, the waveguide element 410 adopts, for example, the structure of the first waveguide element 110. The waveguide element 410 includes a light incoming surface S41 and a light exiting surface S42, and the light incoming surface S41 and the light exiting surface S42 are located on the same surface but different positions of the waveguide element 410. The waveguide element 410 further includes an inclined surface S43. The inclined surface S43 has a reflective coating which reflects an image beam ML1 and an image beam GL after the image beam ML1 and the image beam GL enter the waveguide element 410 via the light incoming surface S41, so that the image beams ML1 and GL travel in the waveguide element 410. The waveguide element 410 further includes a plurality of first beam splitting elements X1, X2, X3, X4, X5 and X6, so that the image beam ML1 and the image beam GL leave the waveguide element 410 via the light exiting surface S42. The image beam ML1 is a light beam entering the inclined surface S43 at a large angle, and is reflected only once on the inclined surface S43, and then travels in the waveguide element 410 and is successively reflected by the first beam splitting elements X1, X2, X3, X4, X5 and X6 to leave the waveguide element 410 and to generate display beams I1, I2, and the like. For example, the display beams I1 and I2 are transmitted to the eyes of the user, so that the user sees a virtual image. The large angle here is, for example, greater than 30 degrees or greater than 45 degrees, and the invention is not limited thereto. Those skilled in the art may determine, according to actual situations, a suitable range of incident angles at which reflection does not occur more than once on the inclined surface S43.

On the other hand, the image beam GL is a light beam entering near a junction area of the light incoming surface S41 and the inclined surface S43, and is thus reflected more than once on the inclined surface S43. As shown in FIG. 4, the image beam GL is transmitted in the waveguide element 410 after being reflected twice on the inclined surface S43 and then is reflected by the first beam splitting elements X1, X2, X3, X4, X5 and X6 to leave the waveguide element 410 and generate a ghost image beam such as G1. Herein, the reason why G1 is named as ghost image beam is that the image beam GL that is reflected twice generates light of an unexpected visual angle, and the unexpected light continues to travel in the waveguide element 410 and is reflected by the first beam splitting elements X1, X2, X3, X4, X5 and X6 to enter the eyes of the user. At this time, the user sees not only an originally expected image but also an unexpected image. Therefore, the light that has undergone reflection twice makes the user feel a ghost image existing in an image when using the near eye display.

In order to reduce the ghost image in the image, in one embodiment of the invention, reflectivity of the reflective inclined surface S13 of the first waveguide element 110 has a first reflectivity distribution in a first incident angle range and a second reflectivity distribution in a second incident angle range. In the embodiment, an angle in the second incident angle range is greater than an angle in the first incident angle range, and a reflectivity average value of the first reflectivity distribution is greater than a reflectivity average value of the second reflectivity distribution. The first incident angle range and the second incident angle range here are each a continuous angle range.

Figure 5:
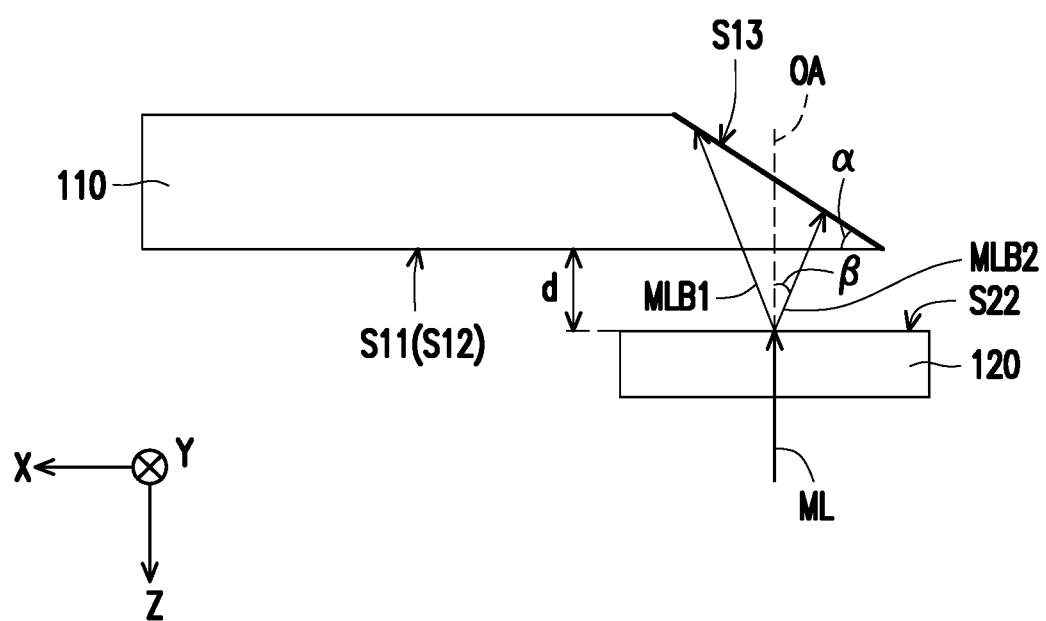
FIG. 5 is a schematic diagram showing an image beam entering a reflective inclined surface according to one embodiment of the invention.
Figure 6A:
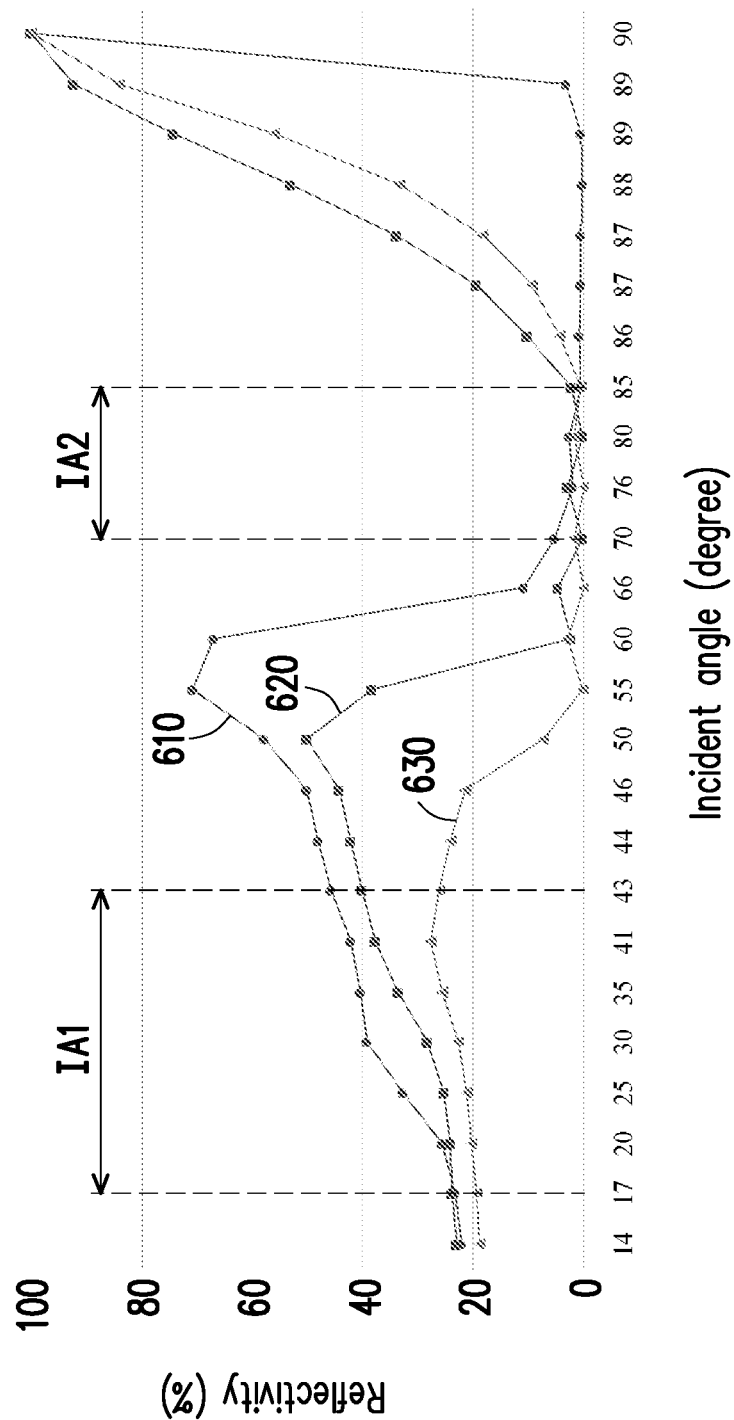
FIG. 6A shows a reflectivity distribution of the reflective inclined surface according to one embodiment of the invention.
Figure 6B:
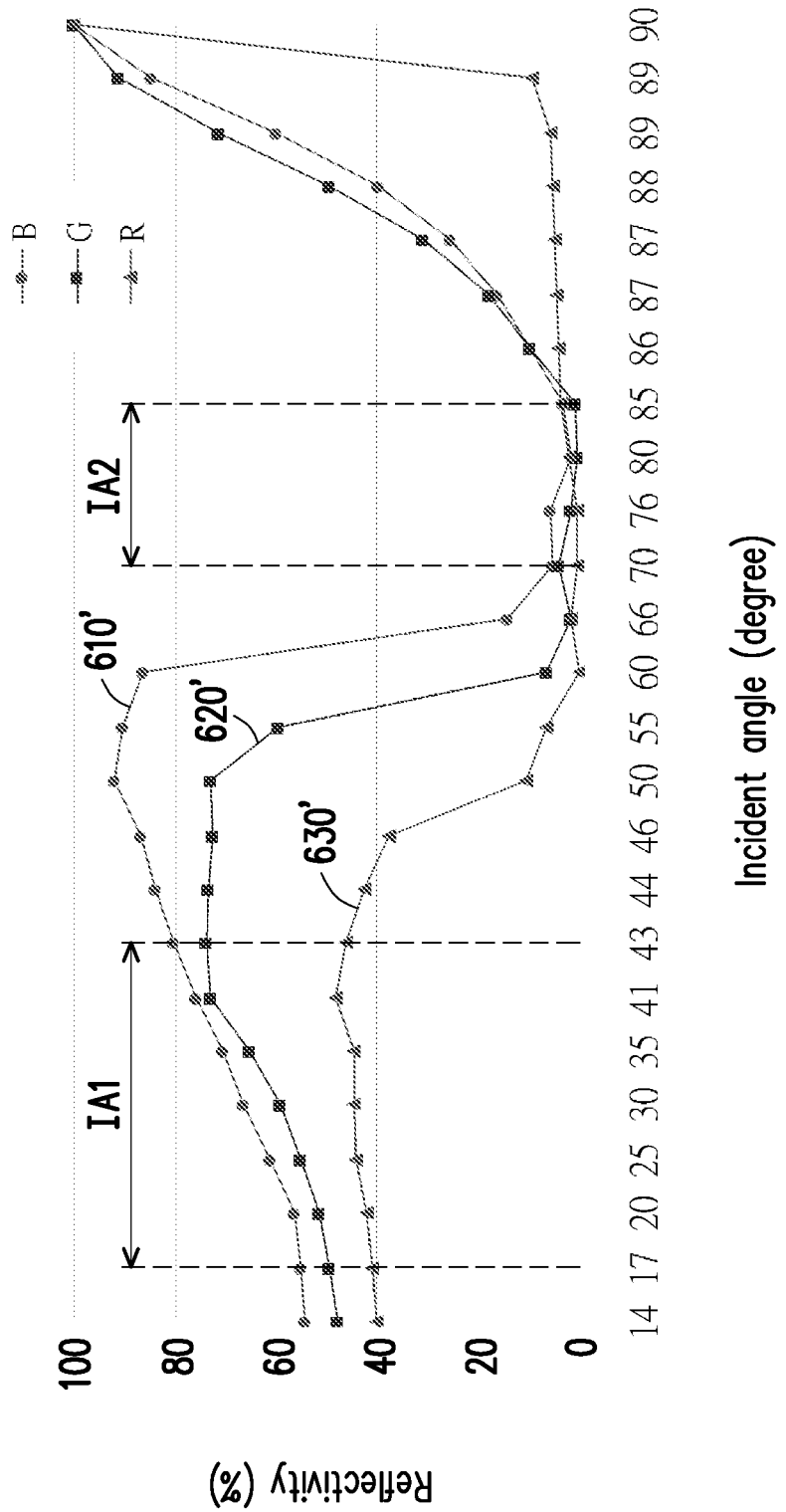
FIG. 6B shows a reflectivity distribution of the reflective inclined surface according to another embodiment of the invention.

Firstly, referring to FIG. 6A and FIG. 6B together with FIG. 5, FIG. 5 is a schematic diagram showing an image beam entering a reflective inclined surface according to one embodiment of the invention. FIG. 6A shows a reflectivity distribution of the reflective inclined surface according to one embodiment of the invention. FIG. 6B shows a reflectivity distribution of the reflective inclined surface according to another embodiment of the invention. In the embodiment, different reflectivities of the reflective inclined surface S13 change in different manners according to light of different wavelengths. Curves 610, 620 and 630 in FIG. 6A respectively show changes of the reflectivities of the reflective inclined surface S13 with respect to incident angle for blue light (having a wavelength of, for example, 465 nm), green light (having a wavelength of, for example, 525 nm), and red light (having a wavelength of, for example, 616 nm). FIG. 6B shows the reflectivities of the reflective inclined surface S13 different from those of the embodiment in FIG. 6A. The curves 610, 620 and 630 in FIG. 6B respectively show changes of the reflectivities of the reflective inclined surface S13 with respect to incident angle for blue light (having a wavelength of, for example, 465 nm), green light (having a wavelength of, for example, 525 nm), and red right (having a wavelength of, for example, 616 nm). The so-called incident angle is an angle at which the image beam enters the reflective inclined surface S13.

In FIG. 6A, a reflectivity distribution in a first incident angle range IA1 is called a first reflectivity distribution, and a reflectivity distribution in a second incident angle range IA2 is called a second reflectivity distribution. The first incident angle range IA1 and the second incident angle range IA2 are each a continuous angle range. The first reflectivity distribution, for example, falls in a range of 20% to 50%. The second reflectivity distribution, for example, falls in a range of 0% to 10%. In FIG. 6B, the first reflectivity distribution, for example, falls in a range of 40% to 70%. The second reflectivity distribution, for example, falls in a range of 0% to 5% or falls in a range of 0% to 10%. In other embodiments, according to different reflectivities of the reflective inclined surface S13, the first reflectivity distribution may, for example, fall in a range of 20% to 70%, and the second reflectivity distribution may, for example, fall in a range of 0% to 10%.

Referring back to FIG. 5, the image beam ML passes through the second waveguide element 120 to enter the first waveguide element 110 along an optical axis OA. In the embodiment, the optical axis OA is in the same direction as the third direction Z. The image beam ML is a diffusion beam with a field of view (FOV). In FIG. 5, light MLB1 and light MLB2 indicate edge light of the field of view of the image beam ML in the first waveguide element 110. The light MLB1 and light MLB2 have an angle $\beta$ with respect to the optical axis, while an included angle formed between the reflective inclined surface S13 and the first light incoming surface S11 is $\alpha$. Therefore, the light that has a major impact on the user's viewing experience has an incident angle in a range of $\alpha +/- \beta$ with respect to the reflective inclined surface S13. Herein, the incident angle of the image beam ML refers to an angle at which the image beam ML enters the reflective inclined surface S13, i.e., an included angle between the optical axis OA and a normal of the reflective inclined surface S13.

For example, the included angle $\alpha$ is 30 degrees, and the included angle $\beta$ is 13 degrees, so the light that mainly enters the eyes of the user is expected to have an incident angle falling in a range of 17 degrees to 43 degrees with respect to the reflective inclined surface S13. On the other hand, if secondary reflection of the light occurs on the reflective inclined surface S13, the incident angle of the secondary reflection light is generally large (referring again to FIG. 4), and is, for example, greater than 70 degrees. Therefore, in the embodiment, the first incident angle range IA1 is, for example, greater than or equal to 17 degrees and less than or equal to 43 degrees, and the second incident angle range IA2 is, for example, greater than or equal to 70 degrees and less than or equal to 85 degrees. According to embodiments of the invention, when the incident angle of the light is 90 degrees, almost 100 percent of the light is reflected. Therefore, in actual manufacturing, the reflectivity of the reflective inclined surface S13 only allows the maximum angle of approximately 85 degrees to cause 5% reflection.

Referring back to FIG. 6A, in the first incident angle range IA1, the reflectivity of the first reflectivity distribution corresponding to a green wavelength 620 is less than the reflectivity corresponding to a blue wavelength 610. Moreover, the reflectivity of the first reflectivity distribution corresponding to a red wavelength 630 is less than the reflectivity thereof corresponding to the green wavelength 620. Furthermore, the reflectivities respectively corresponding to the blue wavelength 610, the green wavelength 620 and the red wavelength 630 increase along with the angle in the first incident angle range IA1.

In the embodiment, the first reflectivity distribution of the reflectivities corresponding to the blue, green and red wavelengths 610, 620 and 630 falls in a range of 20% to 50%. The average of the reflectivity corresponding to the blue wavelength 610 in the first incident angle range IA1 is about 36%. The average of the reflectivity corresponding to the green wavelength 620 in the first incident angle range IA1 is about 30%. The average of the reflectivity corresponding to the red wavelength 630 in the first incident angle range IA1 is about 23%.

In addition, the reflectivities corresponding to the blue, green and red wavelengths 610, 620 and 630 in the second incident angle range IA2 are designed to be less than 10%. In the embodiment, the second reflectivity distribution falls in a range of 0% to 5%. Specifically, the average of the reflectivity corresponding to the blue wavelength 610 in the second incident angle range IA2 is about 3%. The average of the reflectivity corresponding to the green wavelength 620 in the second incident angle range IA2 is about 1%. The average of the reflectivity corresponding to the red wavelength 630 in the second incident angle range IA2 is about 1%. Therefore, the reflectivity and average reflectivity in the first incident angle range IA1 are both greater than the reflectivity and average reflectivity in the second incident angle range IA2 regardless of the corresponding colors. In the embodiment, the second reflectivity distribution even falls in a range of 0% to 5%.

The embodiment of FIG. 6B is similar to that of FIG. 6A. The difference is that the reflectivity average value of the reflective inclined surface in the first incident angle range IA1 according to the embodiment of FIG. 6B is designed to be greater than that of FIG. 6A. The second reflectivity distribution selectively falls in a range of 0% to 10% or falls in a range of 0% to 5%, and the invention is not limited thereto. In the embodiment, the first incident angle range IA1 is greater than or equal to 17 degrees and less than or equal to 43 degrees, and the second incident angle range IA2 is greater than or equal to 70 degrees and less than or equal to 85 degrees. In the embodiment, the first reflectivity distribution of the reflectivities corresponding to blue, green and red wavelengths 610', 620' and 630' falls in a range of 40% to 90%. The average of the reflectivity corresponding to the blue wavelength 610' in the first incident angle range IA1 is about 66.5%. The average of the reflectivity corresponding to the green wavelength 620' in the first incident angle range IA1 is about 61%. The average of the reflectivity corresponding to the red wavelength 630' in the first incident angle range IA1 is about 44.5%. On the other hand, the reflectivities corresponding to the blue, green and red wavelengths 610', 620' and 630' in the second incident angle range IA2 are far less than the reflectivity in the first incident angle range IA1, and even fall in a range of 0% to 5% in the embodiment. Specifically, the average of the reflectivity corresponding to the blue wavelength 610' in the second incident angle range IA2 is about 3%. The average of the reflectivity corresponding to the green wavelength 620' in the second incident angle range IA2 is about 1.8%. The average of the reflectivity corresponding to the red wavelength 630' in the second incident angle range IA2 is about 1.6%. Therefore, the reflectivity and average reflectivity in the first incident angle range IA1 are both greater than the reflectivity and average reflectivity in the second incident angle range IA2 regardless of the corresponding colors.

In the embodiment, similar to the change trend of the reflectivity in the embodiment of FIG. 6A, in the first incident angle range IA1, the reflectivity of the first reflectivity distribution corresponding to the green wavelength 620' is less than the reflectivity corresponding to the blue wavelength 610'. Moreover, the reflectivity of the first reflectivity distribution corresponding to the red wavelength 630' is less than the reflectivity corresponding to the green wavelength 620'. Furthermore, in FIG. 6B, the reflectivities respectively corresponding to the blue wavelength 610', the green wavelength 620' and the red wavelength 630' increase along with the angle in the first incident angle range IA1. However, in the invention, the first incident angle range, the second incident angle range, the range of the first reflectivity distribution and the range of the second reflectivity distribution are not limited and are designed and appropriately selected by those skilled in the art according to actual requirements.

In the embodiments of FIG. 6A and FIG. 6B, the reflective coating on the reflective inclined surface is, for example, formed by stacking a plurality of various films. By utilizing thin film interference, the reflectivity of the first incident angle range in which angles are relatively small is greater than the reflectivity of the second incident angle range in which angles are relatively large. The films may be made of different materials, or may have different reflectivities or different thicknesses, and are designed and appropriately selected by those skilled in the art according to common knowledge, and the descriptions thereof are omitted herein. In addition, the forming method of the reflective coating is not limited in the invention.

Figure 7:
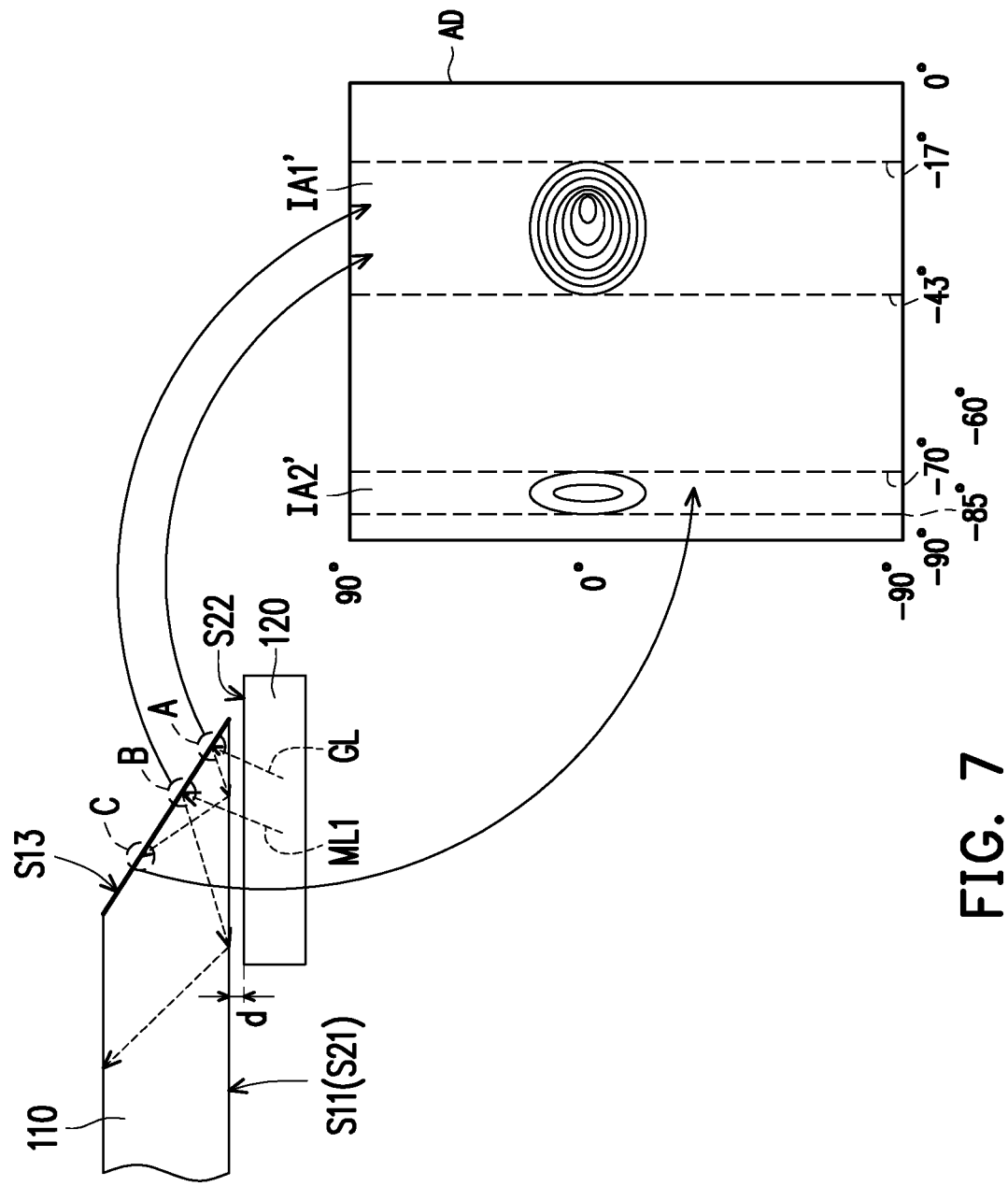
FIG. 7 is a schematic diagram showing reflection of the near eye display device on the reflective inclined surface according to one embodiment of the invention.

Next, referring to FIG. 7, FIG. 7 is a schematic diagram showing reflection of the near eye display device on the reflective inclined surface according to one embodiment of the invention. The near eye display device illustrated in FIG. 7 is, for example, the near eye display device 100 of FIG. 1. The reflective coating of the reflective inclined surface S13 is any one in the embodiments of FIG. 6A and FIG. 6B. AD on the right of FIG. 7 is a diagram showing a distribution of the reflectivity of the reflective inclined surface S13 with respect to different incident angles. A first incident angle range IA1' and a second incident angle range IA2' are each a continuous angle range. The first incident angle range IA1' is greater than or equal to 17 degrees and less than or equal to 43 degrees, and the second incident angle range IA2' is greater than or equal to 70 degrees and less than or equal to 85 degrees.

The image beam ML1 and the image beam GL provided by a display (not shown here) leave the second light exiting surface S22 of the second waveguide element 120, pass through the space d between the second light exiting surface S22 and the first light incoming surface S11, and enter the first waveguide element 110 from the first light incoming surface S11. After entering the first waveguide element 110, the image beam ML1 is reflected once at a point B on the reflective inclined surface S13, and then is reflected to the first beam splitting elements X1, X2, X3, X4, X5 and X6. The incident angle of the image beam ML1 at the point B falls in the first incident angle range IA1'. The reflectivity is, for example, in a range of 40% to 90% or 20% to 50% or in a range of 20% to 70%. Another image beam GL undergoes primary reflection at a point A on the reflective inclined surface S13. The incident angle also falls in the first incident angle range IA1'. The reflectivity is, for example, in a range of 40% to 90% or 20% to 50% or in a range of 20% to 70%. However, the image beam GL further undergoes secondary reflection at a point C on the reflective inclined surface S13. The incident angle falls in the second incident angle range IA2'. The reflectivity is less than 5%, and the image beam GL cannot be effectively transmitted to the first beam splitting elements X1, X2, X3, X4, X5 and X6 to enter the projection target such as the human eye. Therefore, the reflective inclined surface S13 of the embodiment suppresses unexpected light generated by secondary reflection so as to avoid ghost images.

In addition, in one embodiment of the invention, a surface of each beam splitting element in each waveguide element is provided with a transflective coating, i.e., a half-penetration and half-reflection coating, so that a half-penetration and half-reflection optical effect is achieved. In embodiments of FIG. 8 to FIG. 10, reflectivity characteristics of the reflective coating on the surface of the beam splitting elements of the invention are described in detail.

Figure 8:
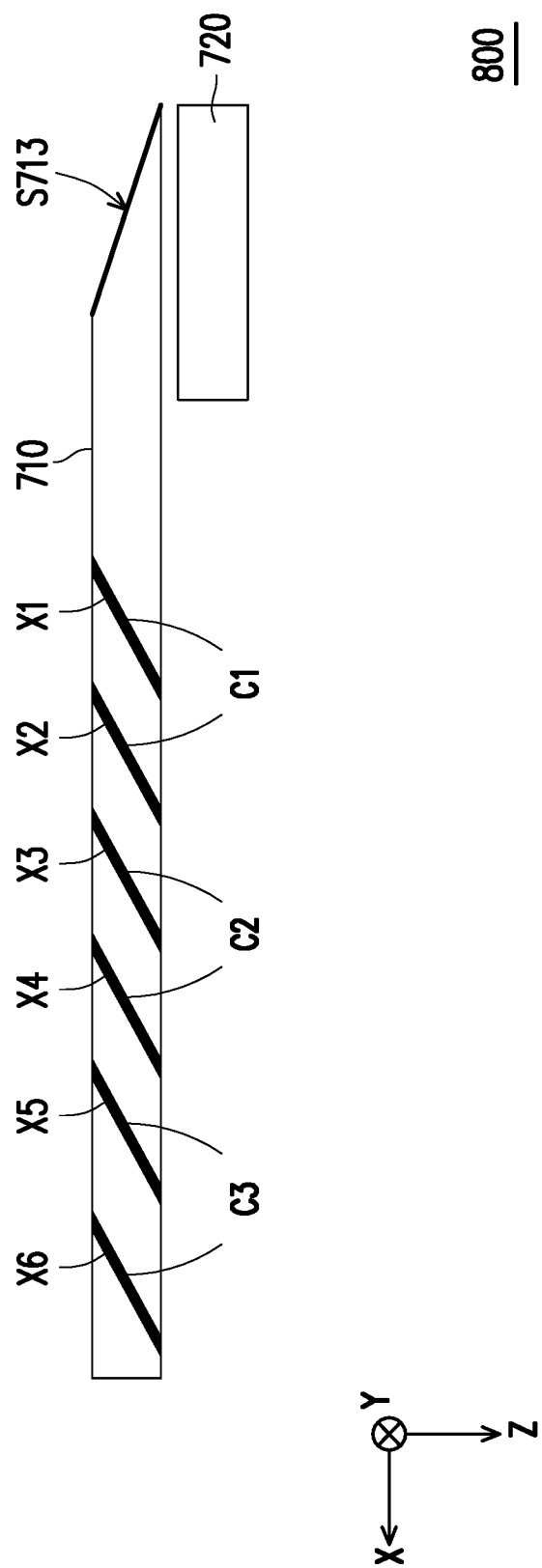
FIG. 8 is a schematic diagram showing the near eye display device according to one embodiment of the invention.

Firstly, referring to FIG. 8, FIG. 8 is a schematic diagram showing the near eye display device according to one embodiment of the invention. A near eye display device 800 includes a first waveguide element 710 with a plurality of first beam splitting elements X1, X2, X3, X4, X5 and X6 arranged in the first direction X and a second waveguide element 720 with second beam splitting elements (not shown here) arranged in the second direction Y. A surface of each of the first beam splitting elements X1, X2, X3, X4, X5 and X6 is provided with a first transflective coating, but the reflectivity characteristics of the first transflective coatings of each first beam splitting element may be the same or different. For example, the first beam splitting elements X1, X2, X3, X4, X5 and X6 are divided into three groups C1, C2 and C3 corresponding to three different reflectivity changes. The reflectivity characteristics of the beam splitting elements of the three groups C1, C2 and C3 can be seen in reference to FIG. 9A, FIG. 9B and FIG. 9C.

The grouping manner or the number of groups of a plurality of first beam splitting elements is not limited. The reflectivity characteristics of each group may be the same or different and be appropriately adjusted by those skilled in the art according to the actual situation.

Figure 9A:
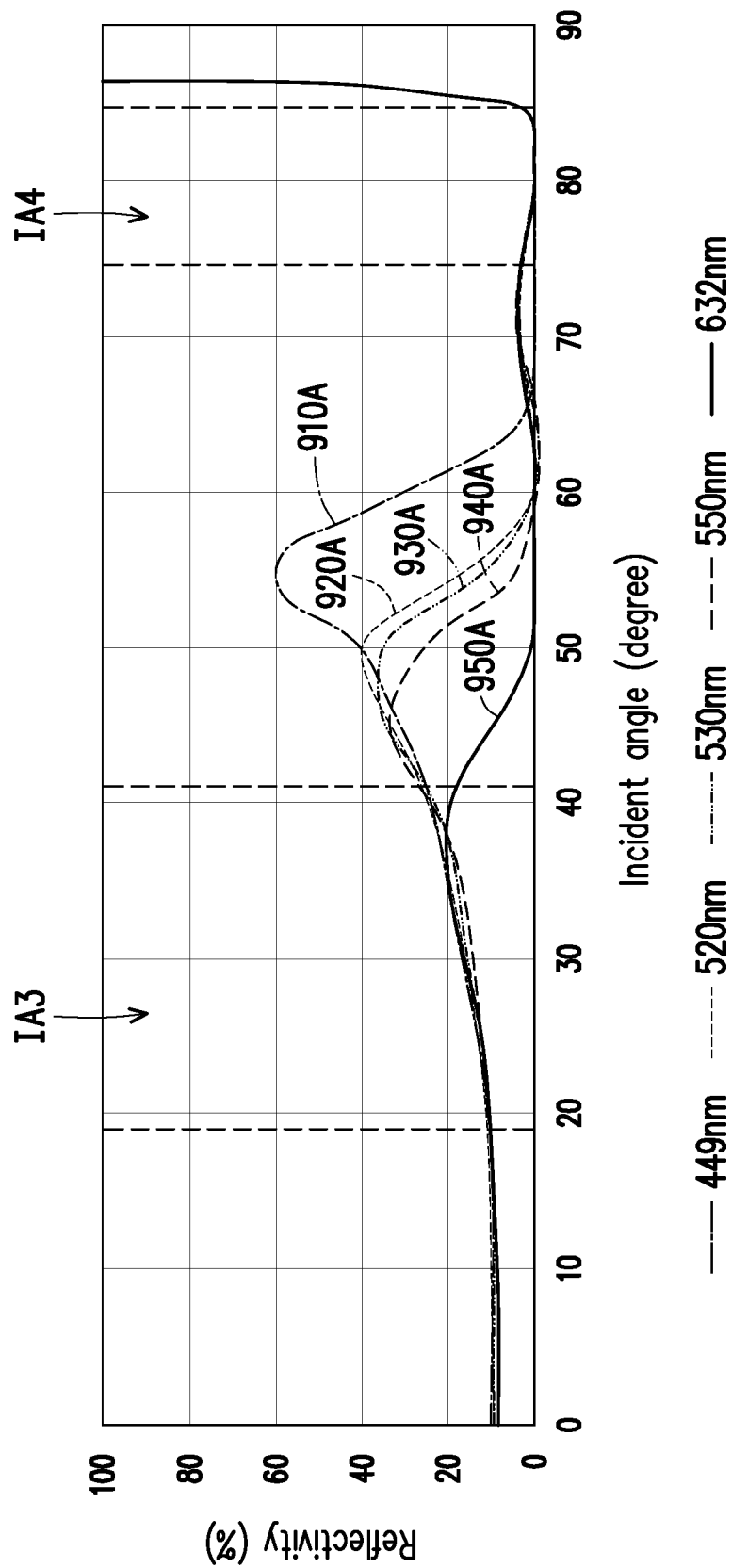
FIG. 9A is a diagram showing a reflectivity distribution of a first beam splitting element according to one embodiment of the invention.

FIG. 9A is a diagram showing a reflectivity distribution of a first beam splitting element according to one embodiment of the invention. In the embodiment, FIG. 9A shows a reflectivity change of the group C1. The first transflective coating of the group C1 does not show significant differences between reflectivity changes with respect to incident light of different wavelengths in a third incident angle range IA3. In the embodiment, the third incident angle range IA3 and a fourth incident angle range IA4 are each a continuous angle range. The third incident angle range IA3, for example, falls in a range of 19 degrees to 41 degrees. An angle in the third incident angle range IA3 is smaller than an angle in the fourth incident angle range IA4. For example, the third incident angle range IA3 is greater than or equal to 19 degrees and less than or equal to 41 degrees, while the fourth incident angle range IA4 is greater than or equal to 75 degrees and less than or equal to 85 degrees.

FIG. 9A shows a reflectivity curve 910A of blue light (for example, corresponding to a wavelength of 449 nm), reflectivity curves 920A, 930A and 940A of three different green light (for example, respectively corresponding to wavelengths of 520 nm, 530 nm and 550 nm), and a reflectivity curve 950A of red light (for example, corresponding to a wavelength of 632 nm). A reflectivity distribution in the third incident angle range IA3 falls in a range of 7% to 16% and increases along with the angle in the third incident angle range IA3.

The reflectivities of the first transflective coating of the group C1 corresponding to the red wavelength 950A, the blue wavelength 910A and the green wavelengths 920A, 930A and 940A in the third incident angle range IA3 have small differences therebetween, and the differences between each wavelength fall in a range of 0 to 5%. The reflectivities of the first transflective coating of the group C1 corresponding to the red wavelength 950A, the blue wavelength 910A and the green wavelengths 920A, 930A and 940A in the fourth incident angle range IA4 are all less than 5%. In addition, the average of the reflectivities in the third incident angle range IA3 is greater than the reflectivity in the fourth incident angle range IA4. The occurrence of errors are taken into consideration for the measured values.

Figure 9B:
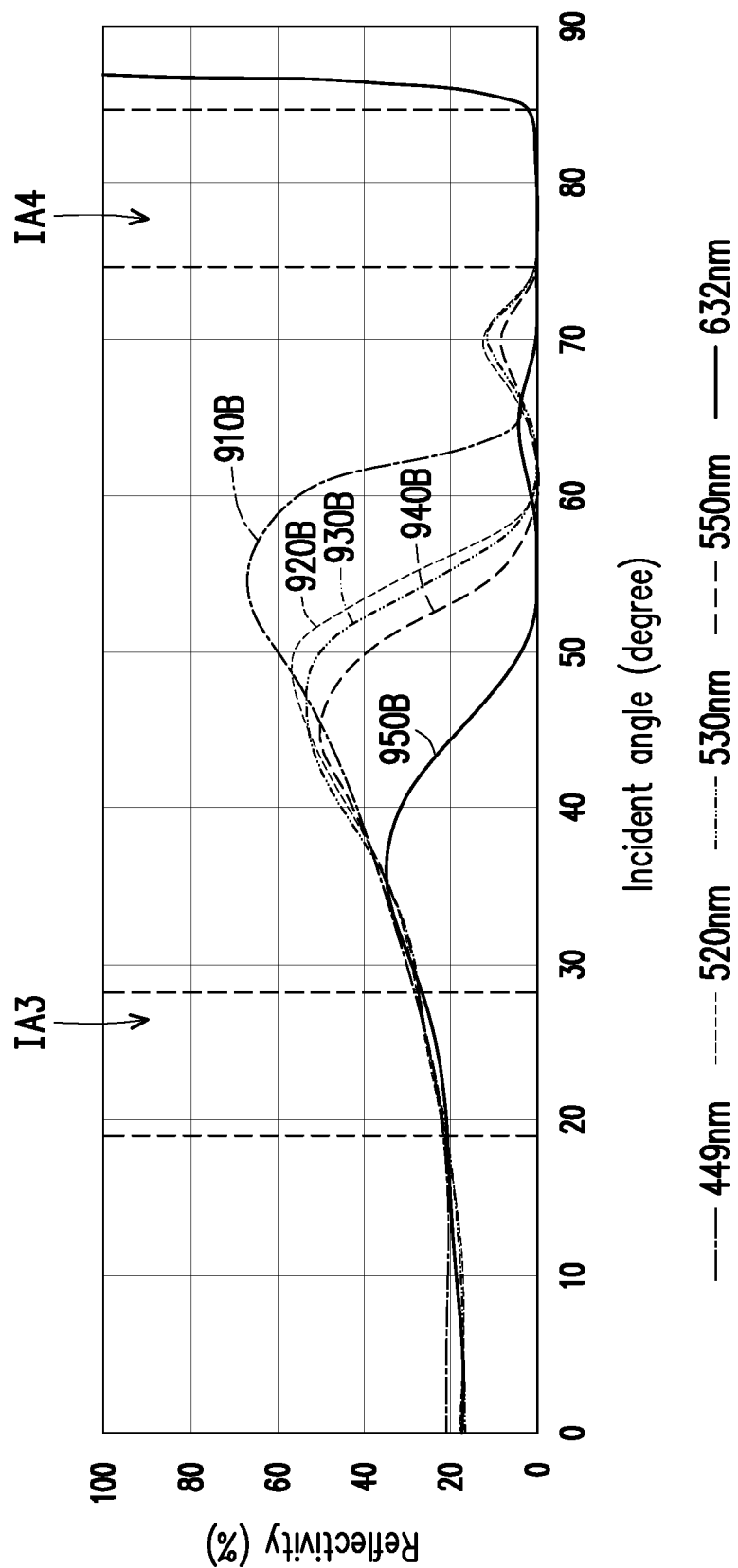
FIG. 9B is a diagram showing a reflectivity distribution of the first beam splitting element according to one embodiment of the invention.

FIG. 9B is a diagram showing a reflectivity distribution of the first beam splitting element according to one embodiment of the invention. FIG. 9B shows a reflectivity change of the group C2. The change characteristics of the reflectivity of the group C2 is similar to the embodiment of FIG. 9A, and the difference is that the third incident angle range IA3 is greater than or equal to 19 degrees and less than or equal to 38 degrees, while the fourth incident angle range IA4 is greater than or equal to 75 degrees and less than or equal to 85 degrees.

FIG. 9B shows a reflectivity curve 910B of blue light (for example, corresponding to a wavelength of 449 nm), reflectivity curves 920B, 930B and 940B of three different green light (for example, respectively corresponding to wavelengths of 520 nm, 530 nm and 550 nm), and a reflectivity curve 950B of red light (for example, corresponding to a wavelength of 632 nm). The reflectivity distribution in the third incident angle range IA3 falls in a range of 17% to 25% and increases along with the angle in the third incident angle range IA3.

The reflectivities of the first transflective coating of the group C2 corresponding to the red wavelength 950B, the blue wavelength 910B and the green wavelengths 920B, 930B and 940B in the third incident angle range IA3 have small differences therebetween, and the differences between each wavelength fall in a range of 0 to 5%. The reflectivities of the first transflective coating of the group C2 corresponding to the red wavelength 950B, the blue wavelength 910B and the green wavelengths 920B, 930B and 940B in the fourth incident angle range IA4 are all less than 5%.

Figure 9C:
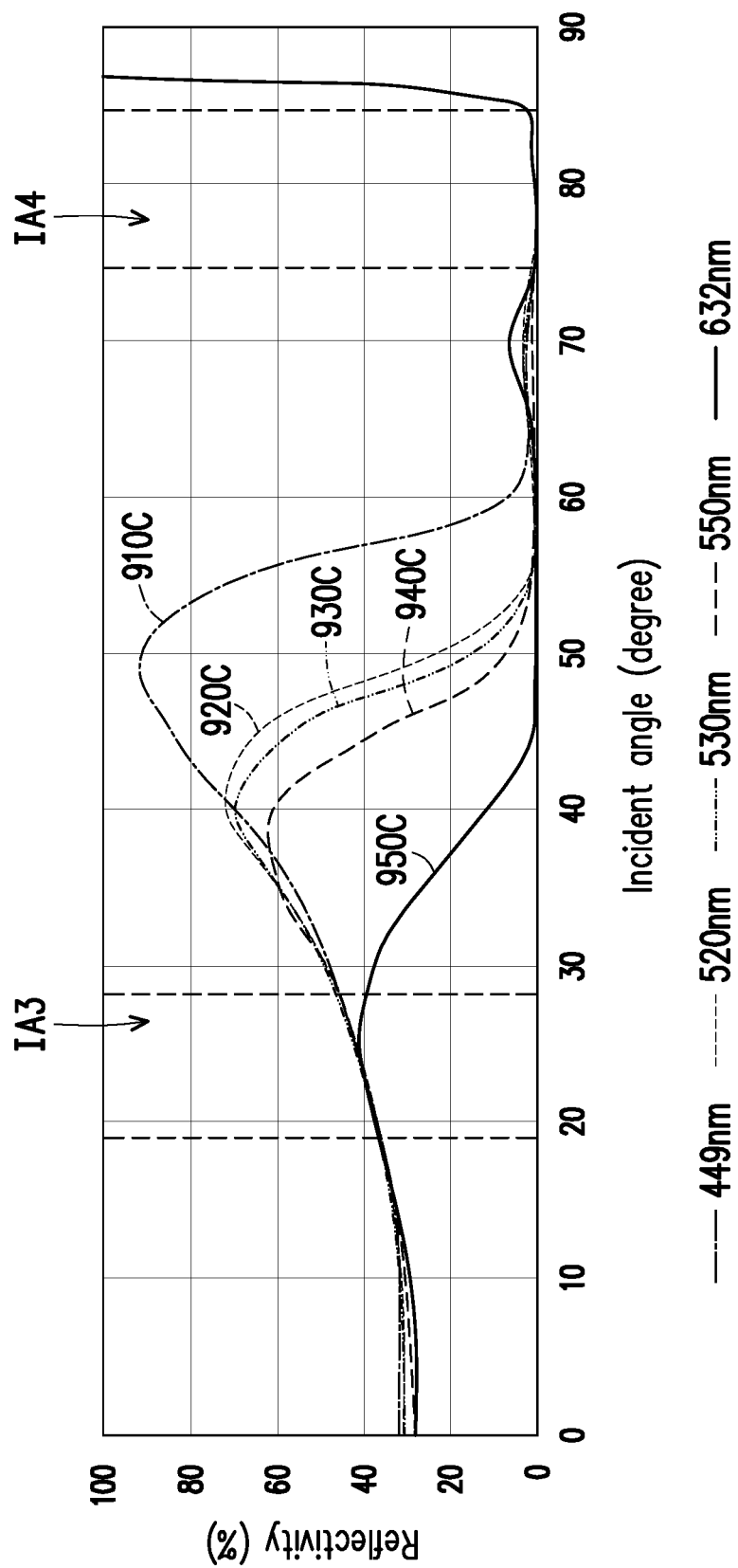
FIG. 9C is a diagram showing a reflectivity distribution of the first beam splitting element according to one embodiment of the invention.

FIG. 9C is a diagram showing a reflectivity distribution of the first beam splitting element according to one embodiment of the invention. FIG. 9C shows a reflectivity change of the group C3. The change characteristics of the reflectivity of the group C3 is similar to the embodiments of FIG. 9A and FIG. 9B, and the difference is that the third incident angle range IA3 is greater than or equal to 19 degrees and less than or equal to 28 degrees. The fourth incident angle range IA4 is greater than or equal to 75 degrees and less than or equal to 85 degrees.

FIG. 9C shows a reflectivity curve 910C of blue light (for example, corresponding to a wavelength of 449 nm), reflectivity curves 920C, 930C and 940C of three different green light (for example, respectively corresponding to wavelengths of 520 nm, 530 nm and 550 nm), and a reflectivity curve 950C of red light (for example, corresponding to a wavelength of 632 nm). The reflectivity distribution in the third incident angle range IA3 falls in a range of 28% to 34% and increases along with the angle in the third incident angle range IA3.

The reflectivities of the first transflective coating of the group C3 corresponding to the red wavelength 950C, the blue wavelength 910C and the green wavelengths 920C, 930C and 940C in the third incident angle range IA3 have small differences therebetween, and the differences between each wavelength fall in a range of 0 to 5%. The reflectivities of the first transflective coating of the group C3 corresponding to the red wavelength 950C, the blue wavelength 910C and the green wavelengths 920C, 930C and 940C in the fourth incident angle range IA4 are all less than 5%.

Figure 10:
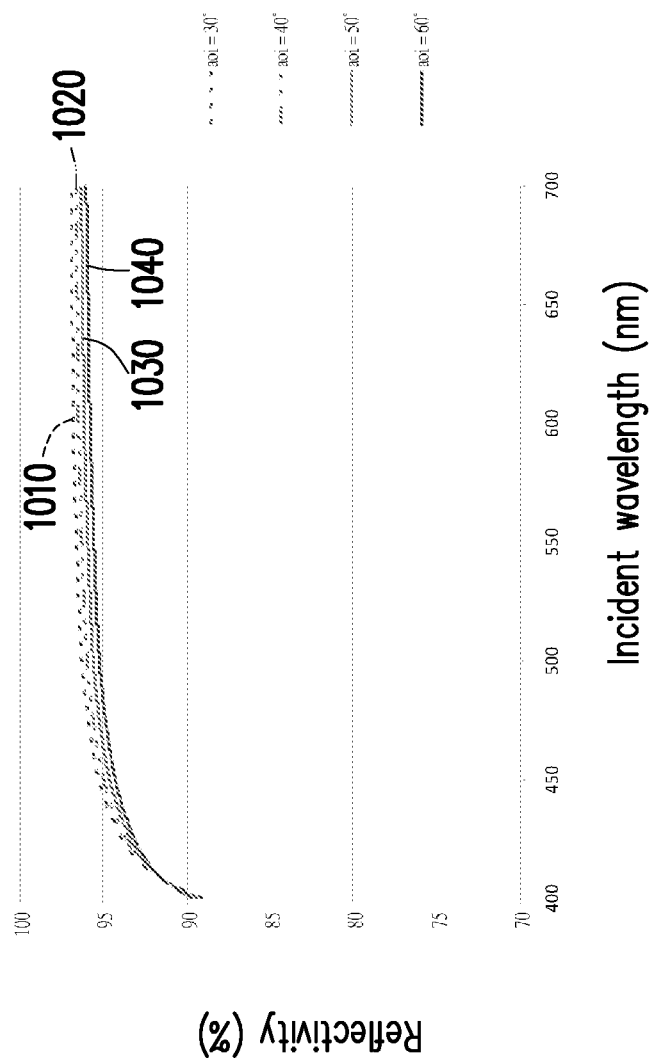
FIG. 10 is a diagram showing a reflectivity distribution of a second beam splitting element according to one embodiment of the invention.

Referring to FIG. 10, FIG. 10 is a diagram showing a reflectivity distribution of a second beam splitting element according to one embodiment of the invention. A surface of each second beam splitting element of the second waveguide element is provided with a second transflective coating. The second transflective coating with the reflectivity characteristics shown in FIG. 10 is applied to any one of the second beam splitting elements in the second waveguide element. In the embodiment, all second beam splitting elements in the second waveguide element have the same reflectivity characteristics and the reflectivity characteristics shown in FIG. 10. In other embodiments, the second beam splitting elements in the second waveguide element may have different reflectivity characteristics from each other.

FIG. 10 shows reflectivity changes at four different incident angles with respect to various wavelengths. A curve 1010 shows a reflectivity change at an incident angle of 30 degrees with respect to various wavelengths. A curve 1020 shows a reflectivity change at an incident angle of 40 degrees with respect to various wavelengths. A curve 1030 shows a reflectivity change at an incident angle of 50 degrees with respect to various wavelengths. A curve 1040 shows a reflectivity change at an incident angle of 60 degrees with respect to various wavelengths. In the embodiment, in a fifth incident angle range, the reflectivities of the second transflective coating corresponding to wavelengths of different colors are very close. The fifth incident angle range is greater than or equal to 30 degrees and less than or equal to 60 degrees. In particular, the differences between the reflectivities corresponding to red, blue and green light fall within 3%.

In some embodiments of the invention, the first beam splitting element is provided with the first transflective coating. The second beam splitting element is provided with the second transflective coating. The differences between the reflectivities of the first transflective coating corresponding to the red, blue and green wavelengths in the third incident angle range fall within 5%. The third incident angle range falls in a range of 19 degrees to 41 degrees. The differences between the reflectivities of the second transflective coating corresponding to the red, blue and green wavelengths in the fifth incident angle range fall within 3%. The fifth incident angle range is greater than or equal to 30 degrees and less than or equal to 60 degrees. Therefore, the beam splitting elements of the near eye display device according to the embodiments of the invention appropriately control the changes of the image beam when the image beam enters and penetrates through the beam splitting elements at different angles. The reflectivity is insensitive to a wavelength change, so that the image is kept homogeneous, and good display quality is provided.

The transflective coating according to the embodiments of the invention is, for example, formed by stacking a plurality of films. The reflectivity change of each wavelength with respect to different incident angles is adjusted by using thin film interference. These films may be made of different materials, or may have different reflectivities or different thicknesses, and are designed and appropriately selected by those skilled in the art according to common knowledge, and the descriptions thereof are omitted herein. In addition, the forming method of the transflective coating is not limited in the invention.

In summary, an exemplary embodiment of the invention provides a near eye display device. The first waveguide element is provided with a plurality of beam splitting elements and the reflective inclined surface. By the reflective inclined surface, an image beam entering the first waveguide element is reflected and transmitted to the plurality of beam splitting elements, and is split by the beam splitting elements to leave the first waveguide element and to be transmitted to the projection target such as the human eye. The reflective inclined surface has the first reflectivity distribution in the first incident angle range and the second reflectivity distribution in the second incident angle range. An angle in the second incident angle range is greater than an angle in the first incident angle range. The reflectivity average value of the first reflectivity distribution is greater than the reflectivity average value of the second reflectivity distribution. The first incident angle range and the second incident angle range are each a continuous angle range. Therefore, the reflective inclined surface suppresses secondary reflection stray light produced by the image beam entering near a junction area of the reflective inclined surface and the light incoming surface, thereby reducing ghost images in the image and providing good display quality. Another embodiment of the invention provides a near eye display device. The first waveguide element is provided with a plurality of beam splitting elements and the reflective inclined surface. By the reflective inclined surface, the image beam entering the first waveguide element is reflected and transmitted to the plurality of beam splitting elements, split by the beam splitting elements, leaves the first waveguide element, and is transmitted to the human eye. A surface of each beam splitting element is provided with a transflective coating. The differences between the reflectivities of the transflective coating corresponding to the red, blue and green wavelengths fall within 5% in a specific and continuous incident angle range. The specific and continuous incident angle range falls in a range of 19 degrees to 41 degrees. Therefore, according to different reflectivity requirements, the beam splitting elements appropriately control changes of the image beam when the image beam enters and penetrates through the beam splitting elements at different angles. The reflectivity is insensitive to a wavelength change, so that the image is kept homogeneous, and good display quality is provided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A near eye display device, comprising a display and a first waveguide element, wherein
the display is adapted to provide an image beam;
the first waveguide element comprises a first light incoming surface, a first light exiting surface, a reflective inclined surface and a plurality of first beam splitting elements, wherein the image beam enters the first waveguide element via the first light incoming surface, the image beam is reflected by the reflective inclined surface in the first waveguide element and transmitted to the plurality of first beam splitting elements, and the image beam is split by the plurality of beam splitting elements and leaves the first waveguide element via the first light exiting surface, wherein
the reflective inclined surface has a first reflectivity distribution in a first incident angle range and a second reflectivity distribution in a second incident angle range, wherein an angle in the second incident angle range is greater than an angle in the first incident angle range, a reflectivity average value of the first reflectivity distribution is greater than a reflectivity average value of the second reflectivity distribution, and the first incident angle range and the second incident angle range are each a continuous angle range, wherein reflectivities of the first reflectivity distribution in the first incident angle range are greater than reflectivities of the second reflectivity distribution in the second incident angle range.

2. The near eye display device according to claim 1, wherein in the first incident angle range, a reflectivity of the first reflectivity distribution corresponding to a green wavelength is less than a reflectivity corresponding to a blue wavelength, and a reflectivity of the first reflectivity distribution bution corresponding to a red wavelength is less than the reflectivity corresponding to the green wavelength.

3. The near eye display device according to claim 1, wherein in the first incident angle range, the first reflectivity distribution increases as the angle in the first incident angle range increases.

4. The near eye display device according to claim 1, wherein a surface of each of the plurality of first beam splitting elements is provided with a first transflective coating, a difference between reflectivities of the first transflective coating corresponding to red, blue and green wavelengths falls within 5% in a third incident angle range, wherein the third incident angle range falls in a range of 19 degrees to 41 degrees.

5. The near eye display device according to claim 4, wherein the reflectivities of the first transflective coating corresponding to the red, blue and green wavelengths are less than 5% in a fourth incident angle range, wherein an angle in the third incident angle range is smaller than an angle in the fourth incident angle range, the fourth incident angle range is greater than or equal to 75 degrees and less than or equal to 85 degrees, and the third incident angle range and the fourth incident angle range are each a continuous angle range.

6. The near eye display device according to claim 1, wherein the second reflectivity distribution falls in a range of 0% to 10%, and the first reflectivity distribution falls in a range of 40% to 90%.

7. The near eye display device according to claim 1, wherein the second reflectivity distribution falls in a range of 0% to 10%, and the first reflectivity distribution falls in a range of 20% to 70%.

8. The near eye display device according to claim 1, wherein the first incident angle range is greater than or equal to 17 degrees and less than or equal to 43 degrees, and the second incident angle range is greater than or equal to 70 degrees and less than or equal to 85 degrees.

9. The near eye display device according to claim 1, further comprising:
a second waveguide element disposed between the display and the first waveguide element, the second waveguide element comprising a second light incoming surface, a second light exiting surface and a plurality of second beam splitting elements, wherein
the image beam from the display enters the second waveguide element via the second light incoming surface, is transmitted to the plurality of second beam splitting elements, leaves the second waveguide element via the second light exiting surface, and enters the first waveguide element via the first light incoming surface.

10. The near eye display device according to claim 9, wherein a surface of each of the plurality of second beam splitting elements is provided with a second transflective coating, a difference between reflectivities of the second transflective coating corresponding to red, blue and green wavelengths falls within 3% in a fifth incident angle range, wherein the fifth incident angle range is greater than or equal to 30 degrees and less than or equal to 60 degrees.

11. A near eye display device, comprising a display and a first waveguide element, wherein
the display is adapted to provide an image beam;
the first waveguide element comprises a first light incoming surface, a first light exiting surface, a reflective inclined surface and a plurality of first beam splitting elements, wherein the image beam enters the first waveguide element via the first light incoming surface, the image beam is reflected by the reflective inclined surface in the first waveguide element and transmitted to the plurality of first beam splitting elements, and the image beam is split by the plurality of beam splitting elements and leaves the first waveguide element via the first light exiting surface to be transmitted to a projection target, wherein the reflective inclined surface has a first reflectivity distribution in a first incident angle range and a second reflectivity distribution in a second incident angle range; and a surface of each of the plurality of first beam splitting elements is provided with a first transflective coating, a difference between reflectivities of the first transflective coating corresponding to red, blue and green wavelengths falls within 5% in a third incident angle range, wherein the third incident angle range falls in a range of 19 degrees to 48 degrees, wherein an angle in the second incident angle range is greater than an angle in the first incident angle range, a reflectivity average value of the first reflectivity distribution is greater than a reflectivity average value of the second reflectivity distribution, and the first incident angle range and the second incident angle range are each a continuous angle range, wherein reflectivities of the first reflectivity distribution in the first incident angle range are greater than reflectivities of the second reflectivity distribution in the second incident angle range.

12. The near eye display device according to claim 11, wherein the reflectivities of the first transflective coating corresponding to the red, blue and green wavelengths are less than 5% in a fourth incident angle range, wherein an angle in the third incident angle range is smaller than an angle in the fourth incident angle range, the fourth incident angle range is greater than or equal to 75 degrees and less than or equal to 85 degrees, and the third incident angle range and the fourth incident angle range are each a continuous angle range.

13. The near eye display device according to claim 11, further comprising:

a second waveguide element disposed between the display and the first waveguide element, the second waveguide element comprising a second light incoming surface, a second light exiting surface and a plurality of second beam splitting elements, wherein the image beam from the display enters the second waveguide element via the second light incoming surface, is transmitted to the plurality of second beam splitting elements, leaves the second waveguide element via the second light exiting surface, and enters the first waveguide element via the first light incoming surface; and a surface of each of the plurality of second beam splitting elements is provided with a second transflective coating, a difference between reflectivities of the second transflective coating corresponding to red, blue and green wavelengths falls within 3% in a fifth incident angle range, wherein the fifth incident angle range is greater than or equal to 30 degrees and less than or equal to 60 degrees.

14. The near eye display device according to claim 11, wherein in the first incident angle range, a reflectivity of the first reflectivity distribution corresponding to the green wavelength is less than a reflectivity corresponding to the blue wavelength, and a reflectivity of the first reflectivity distribution corresponding to the red wavelength is less than the reflectivity corresponding to the green wavelength.

15. The near eye display device according to claim 11, wherein in the first incident angle range, the first reflectivity distribution increases as the angle in the first incident angle range increases.

16. The near eye display device according to claim 11, wherein the second reflectivity distribution falls in a range of 0% to 10%, and the first reflectivity distribution falls in a range of 40% to 90%.

17. The near eye display device according to claim 11, wherein the second reflectivity distribution falls in a range of 0% to 10%, and the first reflectivity distribution falls in a range of 20% to 70%.

18. The near eye display device according to claim 11, wherein the first incident angle range is greater than or equal to 17 degrees and less than or equal to 43 degrees, and the second incident angle range is greater than or equal to 70 degrees and less than or equal to 85 degrees.

* * * * *